United States Patent [19]

Spruyt et al.

[11] 4,079,567
[45] Mar. 21, 1978

[54] METHOD FOR MAKING MOISTURE IMPERVIOUS PACKAGING SYSTEMS

[75] Inventors: Harry Spruyt, New York, N.Y.; Louis S. Hoffman, Morristown, N.J.

[73] Assignee: Scott Paper Company, Philadelphia, Pa.

[21] Appl. No.: 725,084

[22] Filed: Sep. 20, 1976

Related U.S. Application Data

[62] Division of Ser. No. 663,910, Mar. 4, 1976, Pat. No. 4,000,816.

[51] Int. Cl.² .................. B65B 43/00; B65B 47/10
[52] U.S. Cl. ........................................ 53/14; 53/29; 93/55.1 P; 264/248
[58] Field of Search ............... 53/14, 15, 18, 29, 30 R, 53/44, 39, 40, 41; 206/498; 264/248, 254, 263; 220/339; 93/55.1 P, 55.1 R, 39.1 P, 39.1 R

[56] References Cited

U.S. PATENT DOCUMENTS

| | | | |
|---|---|---|---|
| 2,784,539 | 3/1957 | Silver | 53/14 |
| 2,878,524 | 3/1959 | Fink | 264/248 X |
| 3,069,273 | 12/1962 | Wayne | 53/14 X |
| 3,282,413 | 11/1966 | Sparks | 53/29 X |
| 3,354,603 | 11/1967 | Katzew et al. | 53/30 |
| 3,399,763 | 9/1968 | Stone | 53/29 X |
| 3,893,566 | 7/1975 | Ross | 206/498 |
| 3,904,074 | 9/1975 | Hoffman et al. | 220/339 |

*Primary Examiner*—Othell M. Simpson
*Assistant Examiner*—Horace M. Culver

*Attorney, Agent, or Firm*—Martin L. Faigus; William J. Foley

[57] ABSTRACT

Moisture impervious packaging systems for retaining articles include a container body and a closure lid hingedly connected thereto. The container body includes a bottom wall and upwardly extending peripheral walls ending in an upper surface that defines an access opening into an interior compartment in which the articles are retained. The lid includes a peripheral frame member providing the side margins of the lid, and a separate moisture impervious sheet adhered to the frame member for providing the top wall of the lid. The moisture impervious sheet constituting the top wall of the lid preferably is also adhered to the upper surface of the container body for providing a primary moisture impervious seal for the interior compartment of the container body.

The moisture impervious packaging systems are formed by maintaining the peripheral frame member about the outer periphery of the container body with an upper surface of the frame member spaced outwardly from, and adjacent to the upper surface of the container body to circumscribe the access opening into the interior compartment, and, after articles have been deposited into the interior compartment, adhering the moisture impervious sheet to the upper surface of the peripheral frame member to complete the formation of the lid, and preferably to the upper surface of the container body to provide the primary moisture impervious seal for the interior compartment.

7 Claims, 8 Drawing Figures

METHOD FOR MAKING MOISTURE IMPERVIOUS PACKAGING SYSTEMS

CROSS-REFERENCE TO RELATED APPLICATION

This application is a division of application, Ser. No. 663,910, filed Mar. 4, 1976, now U.S. Pat. No. 4,000,816.

BACKGROUND OF THE INVENTION

1. Field of the Invention

This invention relates to moisture impervious packaging systems, and to methods of making them.

2. Description of the Prior Art

Moisture impervious packaging systems for retaining articles therein are well known in the prior art. A representative packaging system of this type is disclosed in U.S. Pat. No. 3,904,074, issued to Louis S. Hoffman et al, and assigned to Scott Paper Company. That packaging system includes, in its preferred embodiment, a container body having an interior compartment for retaining articles therein, and a moisture impervious sheet or film adhered to the container body over the open end thereof to provide a primary seal which prevents moisture from either entering into or escaping from the interior compartment. This primary seal is often necessary to provide a relatively long-shelf, (i.e., 6 months to 2 years) for articles packaged within the container. In addition, the packaging system disclosed in the U.S. Pat. No. 3,904,074 includes a hinged lid which is capable of providing a suitable secondary seal after the primary seal has been broken to prevent damage to the articles prior to the time they are used up.

In packaging systems of the above-described type the hinged lid providing the secondary seal and the moisture impervious sheet providing the primary seal are fabricated as completely separate elements. They are then assembled with the container body to complete the formation of the packaging system.

Although a packaging system as described in the U.S. Pat. No. 3,904,074 has been employed successfully in the sale of premoistened baby wipes, improvements residing in reducing material and manufacturing costs, as well as in simplifying assembly operations are always desirable. It is to these improvements that the instant invention is directed.

SUMMARY OF THE INVENTION

The moisture impervious packaging systems of this invention include a container body and a closure lid hingedly connected thereto. The container body includes a bottom wall and upwardly extending peripheral walls ending in an upper surface that defines an access opening into an interior compartment in which articles are retained. In a preferred embodiment the upper surface of the container body is the top surface of an outwardly extending peripheral flange section of the peripheral walls. The closure lid includes a peripheral frame member and a flexible, moisture impervious sheet. The peripheral frame member circumscribes the outer periphery of the container body to form the peripheral wall of the lid. The frame member includes an upper surface spaced outwardly from the upper surface of the container body. The moisture impervious sheet is adhered to the frame member to provide a top wall of the lid, and, in the most preferred embodiments of the invention, the impervious sheet is also adhered to the frame member to provide a moisture impervious seal over the access opening into the interior compartment of said container body.

When the moisture impervious sheet which forms the top wall of the lid also is adhered to the upper surface of the container body to provide a moisture impervious seal for the interior compartment, the need for a separate sheet to form such a seal is eliminated. Accordingly, less material is required to form the packaging systems of this invention, than is required to form packaging systems of the type disclosed in U.S. Pat. No. 3,904,074. A further advantage of the preferred embodiments of the instant invention is that the primary seal is formed simultaneously with completing the formation of the lid in its closed position. This eliminates the need for a separate assembly step of placing the lid in a closed position on the container body after the primary seal has been applied to said container body.

In accordance with the method of this invention the moisture impervious packaging systems are formed by maintaining the peripheral frame member about the outer periphery of the container body with an upper surface of the frame member spaced outwardly from and adjacent to the upper surface of said container body to circumscribe the access opening into the interior compartment. After articles have been deposited into the interior compartment a moisture impervious sheet is adhered to the peripheral frame member to complete the formation of the closure lid, and preferably to the upper surface of the container body to form a moisture impervious seal for the interior compartment. Accordingly, the fabrication of the closure lid is completed with the lid in its closed position, and at the same time a primary moisture impervious seal for the interior compartment of the container body is formed. This provides for a simple and reliable assembly operation which is not achieved in the fabrication of packaging systems of the type disclosed in U.S. Pat. No. 3,904,074.

In one embodiment of this invention the peripheral frame member is molded separately from the container body. In this embodiment transversely aligned flexing regions are provided in side walls of the peripheral frame member intermediate front and rear ends thereof to provide the hinge for the lid. Preferably the flexing regions are provided by weakening the frame member, such as by thinning or notching the sidewalls of the peripheral frame member. The weakened regions of the frame member divide the lid into a forward movable door portion and a rearward stationary cover portion when the lid is connected to the container body. The region of the frame member forming the peripheral wall of the cover portion of the lid includes a retaining rib which extends inwardly into underlying relationship with a downwardly facing surface of the rear and side peripheral walls of the container body. Preferably, this downwardly facing surface is provided by an outwardly extending peripheral flange section of the peripheral walls of the container body. The moisture impervious sheet of the closure lid is adhered to both the upper surface of the container body and the upper surface of the peripheral frame member to cooperate with the inwardly extending retaining rib for maintaining the cover portion of the closure lid in a stationary condition on the container body when the door portion of the lid is opened.

Preferably, a latching tab extends inwardly from a front end of the peripheral frame member into underlying relationship with a downwardly facing surface of a front peripheral wall of the container body to positively maintain the door portion in a closed position when desired. This latching tab is manually defeatable by a user to permit the door portion to be pivoted about the hinge of the frame member for providing access into the interior compartment of the container body to remove articles therefrom.

The packaging system including the above-described peripheral frame member is formed by positioning the container body within a central opening provided by the peripheral frame member with the downwardly facing surfaces of the container body disposed in overlying relationship with the retaining rib of said frame member. When a latching tab is provided on the frame member a downwardly facing surface of the container body will also be disposed in overlying relationship with said latching tab. Preferably, the container body and peripheral frame member are supported in a suitable jig so as to maintain the above-described relationship, and the moisture impervious sheet is adhered to the upper surfaces of the container body and peripheral frame member by a suitable adhesive.

In an alternative embodiment of this invention the hinge comprises a web of resilient material connecting the rear end of the peripheral frame member to a rear peripheral wall of the container body. In this embodiment the frame member, hinge and container body may be integrally injection molded as a single unit with the peripheral frame member circumscribing the outer periphery of the container body in the position it assumes when the lid is closed. By forming the peripheral frame member in a closed lid position the amount of mold space required to injection mold the packaging system is substantially reduced, as compared to the mold spaced required to mold the lid in an opened position relative to the container body, or as a completely separate member.

This same embodiment may also be vacuum molded by forming the container body with a peripheral flange having a width substantially equal to the combined widths of the frame member and container body flange section. The flange is then die cut intermediate its marginal ends to separate the frame member. A section of the flange is left uncut to provide the web of resilient material which forms the hinge connection between the frame member and the container body.

After the container body, hinge and peripheral frame have been formed as a single unit a moisture impervious sheet is adhered to the peripheral frame member to complete the formation of the lid in its closed position. Most preferably the moisture impervious sheet is also adhered to the upper surface of the container body to provide a primary moisture impervious seal for the packaging system. The peripheral frame member and container body can be retained directly in the mold or die in which it is formed when the moisture impervious sheet is adhered to the container body and frame member, or alternatively, the container body and integrally joined peripheral frame member can be retained in a separate supporting jig.

Preferably, a front end of the peripheral frame member is provided with an inwardly directed latching tab extending into underlying relationship with a downwardly facing surface of a front peripheral wall of the container body to positively maintain the lid in a closed position after the primary moisture impervious seal has been broken by the opening of the lid. However, when the peripheral frame member of the lid and the container body are molded simultaneously with the peripheral frame member in a closed lid position circumscribing the outer periphery of the container body it is extremely difficult, if not impossible, to directly mold the latching tab in underlying relationship with a downwardly facing surface on the container body. Accordingly, in a preferred method of this invention in which a latching tab is provided on the peripheral frame member, the latching tab end of the frame member is initially molded or die-cut so that the inwardly extending latching tab terminates exteriorly of the downwardly facing surface of the front peripheral wall of the container body. After the forming operation the latching tab end of the frame member is depressed inwardly, such as by placing the combined container and frame assembly in a suitable jig, to force the latching tab into underlying relationship with the downwardly facing surface on the front peripheral wall of the container body. The frame member is maintained in this depressed condition as the moisture impervious sheet is adhered in a taut condition to the upper surfaces of the container body and the frame member. The moisture impervious sheet will maintain the frame member in its depressed condition after the depressing force has been removed, i.e., after the packaging system has been removed from its supporting jig. This method of forming a packaging system provides the two-fold advantage of permitting the container body and frame member to be simultaneously formed with the peripheral frame member in its closed lid position to minimize mold space, and at the same time, permits the inclusion of a latching tab on the frame member for positively maintaining the lid in a closed position after the primary seal has been broken.

Other objects and advantages of this invention will become apparent by referring to the detailed description which follows, taken in conjunction with the drawings.

DESCRIPTION OF THE PREFERRED EMBODIMENTS OF THE INVENTION

This invention relates to packaging systems which are substantially moisture impervious. These packaging systems find their most significant application for retaining articles therein which would be damaged by either the entrance of moisture into the packaging system or the escape of moisture from the packaging system. One specific application of the present invention is in the packaging of premoistened fibrous webs which can be employed as wipers for many applications. For example, such premoistened wipers are becoming popular for cleansing many parts of the human body, such as the perineal region, arms, hands, etc. Although the packaging systems of this invention will be described in connection with premoistened wipers, it should be understood that this use is merely illustrative, and is not intended to be a limitation on the broader aspects of the instant invention.

Figure 1:
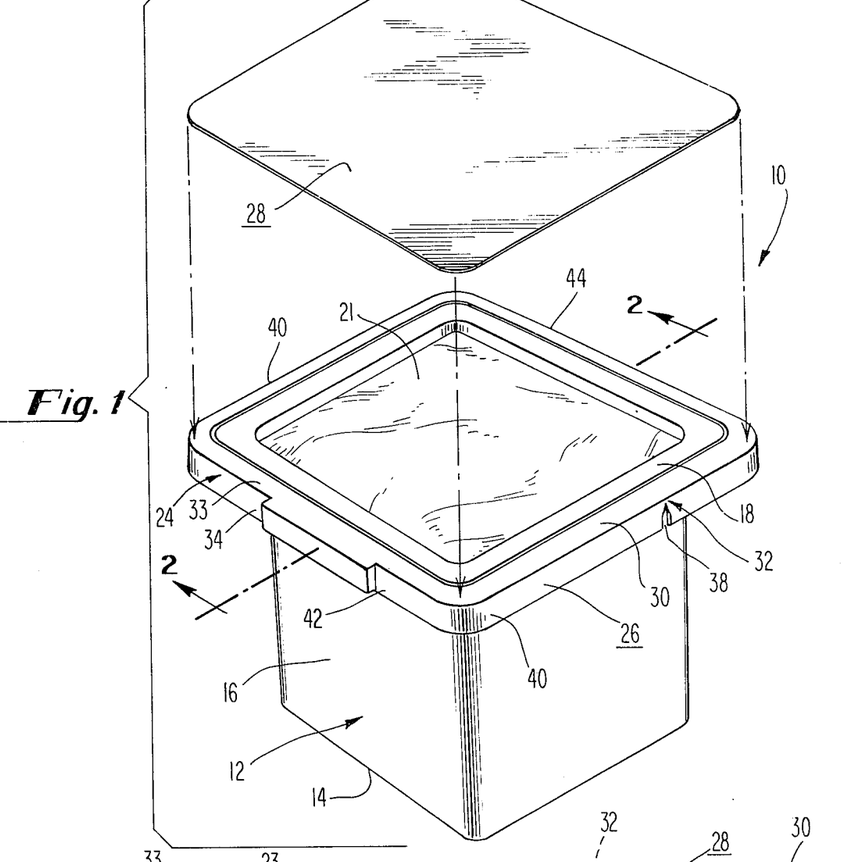
FIG. 1 is partially exploded isometric view of a moisture impervious packaging system of this invention.
Figure 2:
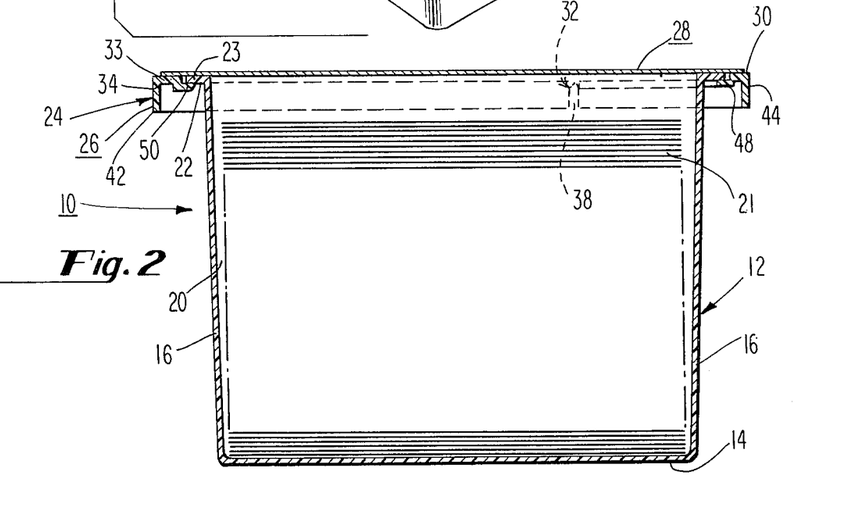
FIG. 2 is sectional view taken along line 2—2 of FIG. 1, with the elements of the packaging system assembled.

Referring to FIGS. 1 and 2, a packaging system 10 in accordance with this invention includes a container body 12 having a bottom 14 and upwardly extending peripheral walls 16 that end in an upper surface 18. The upper surface 18 defines an access opening into an interior compartment 20 in which premoistened fibrous webs 21 are contained in a stacked condition. The container body 12 includes a downwardly facing surface 22 which, along with the upper surface 18, is provided by an outwardly directed peripheral flange section 23 of the peripheral walls 16.

Figures 3, 4:
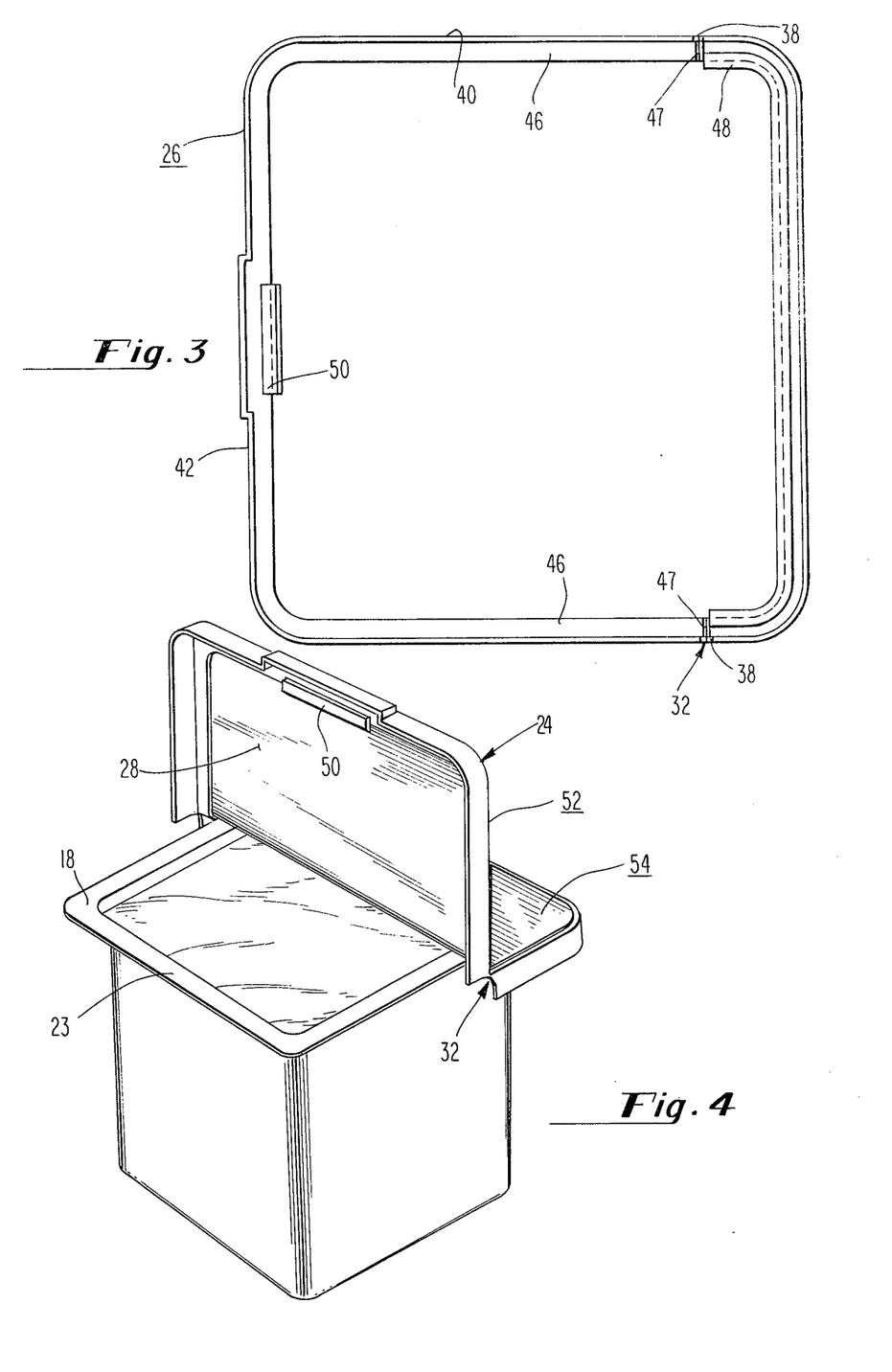
FIG. 3 is bottom view of the closure lid frame member of the packaging system of FIG. 1.
FIG. 4 is an isometric view of the packaging system of FIG. 1 with the closure lid in its opened position.

Referring to FIGS. 1-3, a closure lid 24 forms a part of the packaging system 10, and includes a peripheral frame member 26 and a flexible, moisture impervious sheet 28. The peripheral frame member 26 forms the sides of the lid and the moisture impervious sheet 28 forms the top of the lid. The frame member 26 includes an upper surface 30 adjacent to, and spaced outwardly from the upper surface 18 of the container body 12 when the lid is in a closed position. Accordingly, the peripheral frame member 26 circumscribes the container body 12.

The moisture impervious sheet 28 forms the top of the lid 24 by being adhered to the upper surface 30 of the frame member 26. In addition, the moisture impervious sheet 28 is adhered to the upper surface 18 of the container body 12 to provide a primary moisture impervious seal for the interior compartment 20 to provide a relatively long shelf life for the premoistened wipes, e.g., from about 6 months to about 2 years. Any adhesive which is compatible with the materials of the moisture impervious sheet 28, the container body 12 and the peripheral frame member 26 can be employed to adhere the moisture impervious sheet to the container body and frame member. Alternatively, if the moisture impervious sheet 28 includes a material which can be compatibly bonded directly to the container body 12 and the peripheral frame 26 the use of heat and pressure may be sufficient to affect the bonds.

The closure lid 24 is hingedly connected to the container body through a hinge 32 provided in the peripheral frame member 26 to permit access to the interior compartment 20 of the container body without completely removing the lid 24 from said body. The specific structure providing this function will be described in detail later in this application.

Preferably the peripheral frame member 26 is a unitary, injection molded member including a top wall 33 and a downwardly extending peripheral skirt 34. The top wall 33 includes the upper surface 30 of the frame member. The hinge 32 is provided by transversely aligned thinned regions provided by notches 38 in opposed side walls 40 of the peripheral skirt 34 intermediate front and rear end walls 42 and 44, respectively, of the frame member 26. If necessary to provide an acceptable hinge action for the closure lid 24, the lower surface 46 of the top wall 33 of the frame member can also be provided with thinned regions 47 that are transversely aligned with the notches 38 (FIG. 3).

Referring to FIGS. 2 and 3, the peripheral frame member 26 includes a retaining rib 48 provided by an inwardly directed extension of top wall 33 at the rear and sides of the peripheral frame member. This rib terminates adjacent the hinge 32. The retaining rib 48 can be continuous, or discontinuous as desired. Preferably, a latching tab 50 is provided by an inwardly directed extension of top wall 33 at the front end of the peripheral frame member.

In a method of fabricating the packaging system 10 in accordance with this invention the container body 12 and the peripheral frame member 26 are molded as separate elements. The container body is inserted through the central opening of the frame member 26, and the container and frame member are supported in a suitable jig such that the downwardly facing surface 22 of the peripheral flange section 23 of the container body 12 seats on the retaining rib 48 and latching tab 50 of the frame member 26. Preferably the frame member 26 is dimensioned such that the upper surface 18 of the container body 12 and the upper surface 30 of the frame member 26 are maintained in substantially the same plane to facilitate the subsequent adherence of the moisture impervious sheet 28 to both upper surfaces (FIG. 1). After the moisture impervious sheet 28 has been adhered to the upper surfaces 18 and 30 of the container body 12 and frame member 26, respectively, the peripheral flange section 23 of the container body is positively captured between the moisture impervious sheet on the top, and the retaining rib 48 and locking tab 50 on the bottom. Accordingly, by the simple operation of adhering the moisture impervious sheet 28 to the container body 12 and the peripheral frame member 26, the formation of the closure lid 24 is completed with the lid latched in its closed position, and a primary moisture impervious seal is provided for the interior compartment 20. Therefore, a separate assembly step of closing the lid is not necessary in the packaging system 10 of this invention. Moreover, since a single moisture impervious sheet provides both the top wall of the closure lid 24 and a primary moisture impervious seal for the interior compartment 20 the material costs are reduced, as compared to similar packaging systems in which the lid is formed separate and apart from the moisture impervious sheet employed as a primary seal for the interior compartment of the container body. Obviously, the contents to be contained within the packaging system 10 are placed within the interior compartment 20 prior to adhering the moisture impervious sheet 28 to the upper surfaces of the container body 12 and the peripheral frame member 26.

Referring to FIG. 4, the hinge 32 divides the lid 24 into a forward movable door portion 52 and a rearward stationary cover portion 54. The cooperative locking arrangement between latching tab 50 and peripheral flange section 23 can be manually defeated by a user to permit the door portion 52 to be pivoted about the hinge 32 to the position shown in FIG. 4. This pivotal movement peels the moisture impervious sheet 28 from the upper surface 18 of the container body 12 to break the primary seal. This peel force is not imposed between the moisture impervious sheet 28 and the upper surface of the peripheral frame member 26. Accordingly, the moisture impervious sheet 28 remains adhered to the frame member 26 as the door portion 52 is pivoted to its open position shown in FIG. 4.

The stationary cover portion remains connected to the container body by the cooperation of the retaining rib 48 and the moisture impervious sheet 28 with the flange section 23 of the container body. The hinge 32 prevents the sheet 28 from being peeled off of the upper surface 18 of the container body rearwardly of the hinge.

Figure 5:
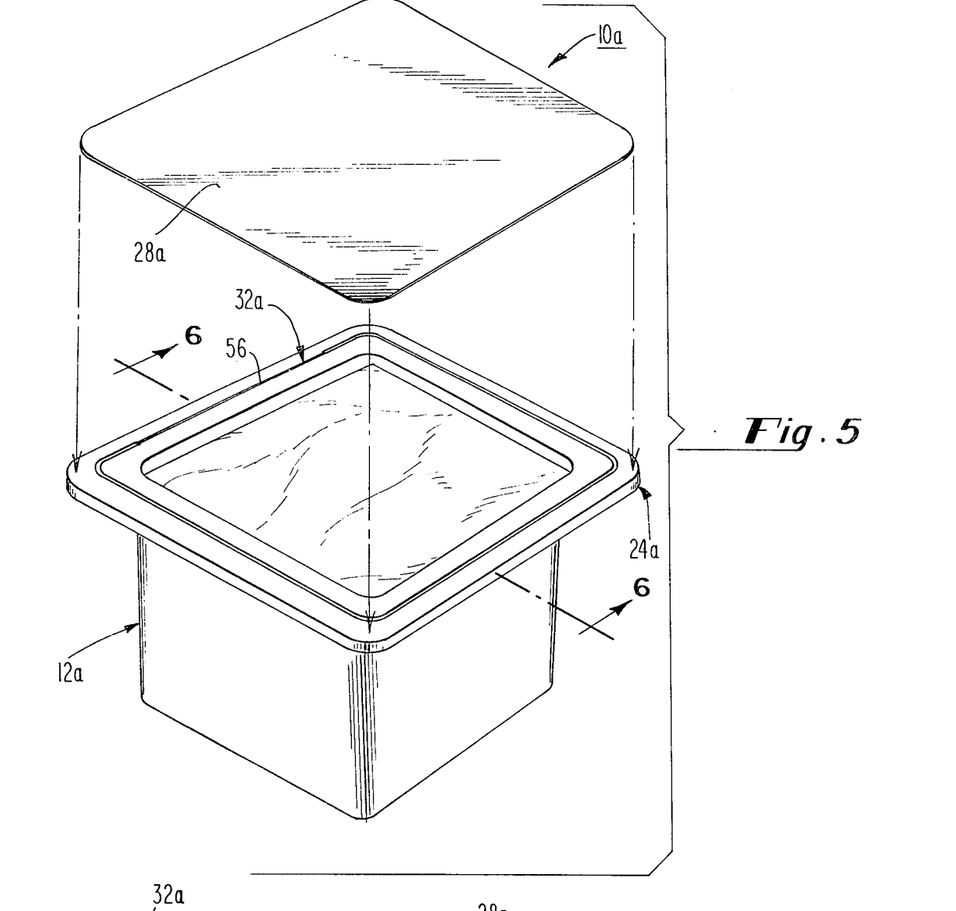
FIG. 5 is an exploded isometric view of an alternative embodiment of a packaging system of this invention.
Figure 6:
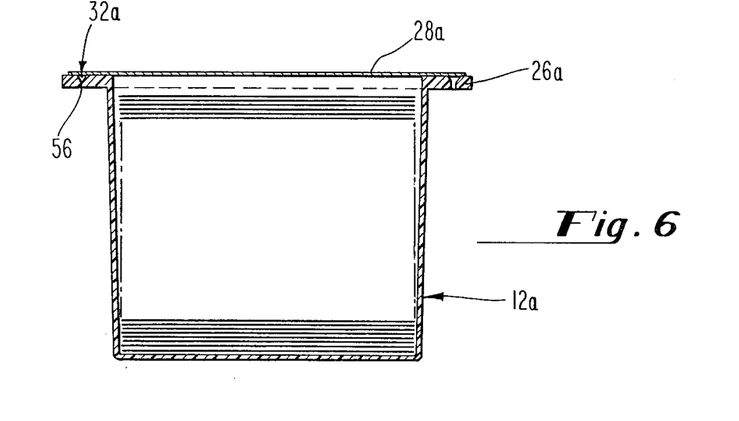
FIG. 6 is a sectional view along line 6—6 of FIG. 5 with the elements of the packaging system assembled.

Referring to FIGS. 5 and 6, an alternative embodiment of a packaging system 10a in accordance with this invention is disclosed. This packaging system includes a container body 12a having generally the same structure as that disclosed in connection with the packaging system 10. However, in this embodiment a hinge 32a between the container body 12a and a closure lid 24a is provided by a flexible web section 56 connecting a rear wall of a peripheral frame member 26a with a rear wall of a peripheral flange section 23a of the container body. The peripheral frame member 26a does not include an inwardly directed retaining rib or latching tab, as disclosed in connection with the packaging system 10. The peripheral frame member 26a is shown as a substantially flat member, i.e., it is devoid of a downwardly extending peripheral skirt. However, such a skirt should be provided if greater rigidity of the frame member is desired, or required.

The container body 12a and peripheral frame member 26a of the packaging system 10a may be formed simultaneously by an injection molding operation with the web section 56 connecting the rear ends of said frame member and container body. The peripheral frame member 26a is molded in its closed lid position circumscribing the outer periphery of the container body 12a. This provides a fabricating advantage by reducing the mold cavity space required to form the packaging system, as compared to that required to mold the container body with a lid in an opened position, or to mold the lid and container body as completely separate and distinct members.

The container body 12a, peripheral frame member 26a, and web section 56 of the packaging system 10a may also be formed by a vacuum molding and die-cutting process. In accordance with this latter process the container body 12a is formed with a peripheral flange having a width substantially equal to the combined widths of the frame member 26a and flange section 23a of the container body. A die is them employed to die-cut the flange intermediate its marginal ends to separate the frame member 26a from the flange section 23a. A section of the flange is left uncut to provide the web section 56 which forms the hinge connection between the rear ends of the frame member and the container body.

After the container body 12a and peripheral frame member 26a have been formed, a moisture impervious sheet 28a is adhered to the frame member and container body in the same manner as described above in connection with fabrication of the packaging system 10.

Since the packaging system 10a does not include a latching tab for positively retaining the lid 24a in a closed position after it has once been initially opened to break the primary seal, the weight of the closure lid must be relied upon to provide an effective secondary seal for the container compartment. However, such an arrangement may not be suitable for many applications. Accordingly, it is highly desirable to be able to form a moisture impervious packaging system with its lid in a closed position, as shown in FIGS. 5 and 6, and at the same time include a latching tab extending inwardly from the peripheral frame member for underlying a downwardly facing surface of the container body to positively retain the lid in a closed position.

Figure 7:
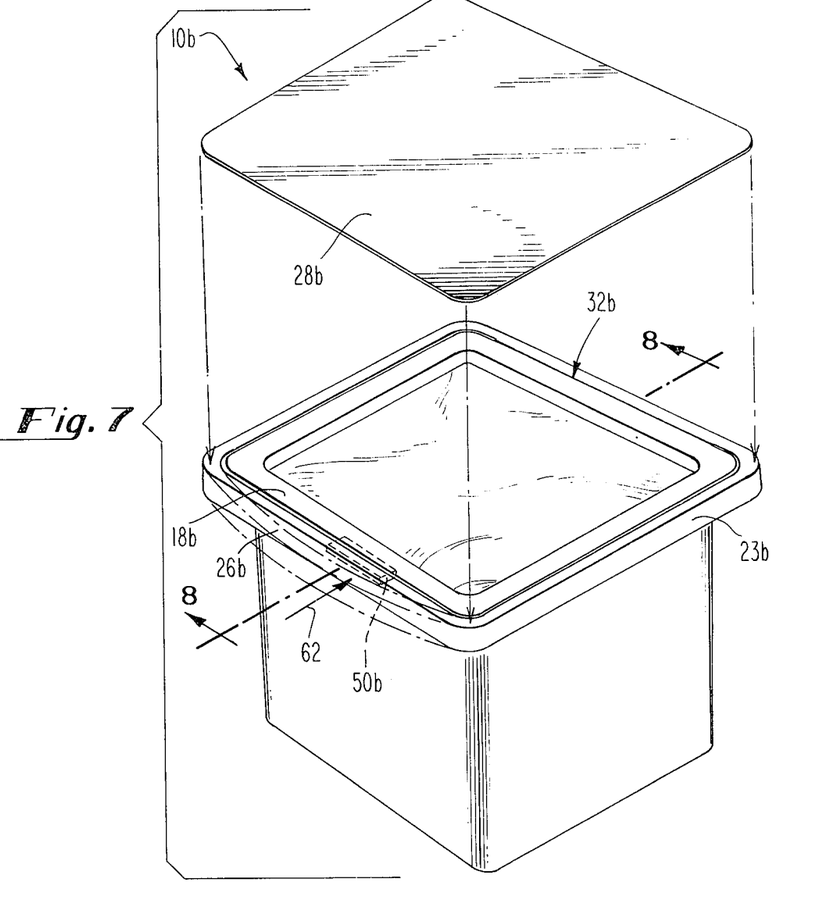
FIG. 7 is an exploded isometric view of another embodiment of a packaging system of this invention with the phantom line representation showing an intermediate stage of formation.
Figure 8:
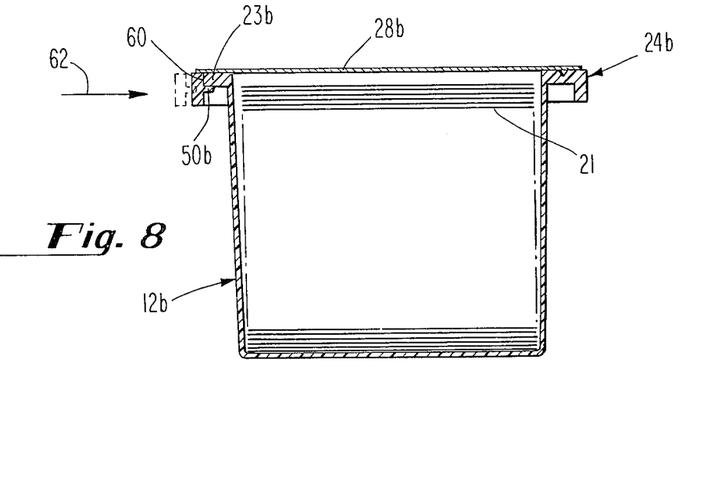
FIG. 8 is a sectional view along line 8—8 of FIG. 7, showing the packaging system in its completed form.

Referring to FIGS. 7 and 8, a packaging system 10b is substantially identical to the packaging system disclosed in FIGS. 5 and 6, but includes a latching tab 50b (FIG. 8) which is adapted to underlie a peripheral flange section 23b of container body 12b for positively maintaining a lid 24b in a closed position after said lid has been opened to break the connection between moisture impervious sheet 28b of the lid and upper surface 18b of the container body.

In conventional injection molding operations a latching tab cannot be directly molded separate from, and in close underlying relationship with a peripheral flange of a container body when molding a peripheral frame member containing said tab in its closed lid position. This results from the fact that the latching tab must underlie and be engaged with the undersurface of the peripheral flange when the frame member is in a closed position. If it is attempted to directly mold the latching tab in underlying engagement with the lower surface of the peripheral flange the latching tab merely becomes a continuous connected extension of lower surface of the peripheral flange, and would subsequently have to be separated from the flange in an additional manufacturing operation.

In accordance with a unique method of this invention for forming the packaging system 10b a peripheral frame member 26b is molded in circumscribing relationship with the container body 12b in the configuration shown in phantom lines in FIG. 7. The phantom position of latching tab 50b is omitted from FIG. 7 for simplicity of illustration. Referring to FIG. 8, the latching tab 50b is an integral, inwardly directed extension of the frame member 26b, and terminates in outwardly spaced relationship to an outer margin 60 of the peripheral flange 23b as shown in phantom. If desired the injection molding operation can be carried out in a manner which connects the outermost edge of the latching tab 50b to the outer margin 60 of the peripheral flange 23b through a thin plastic section which is referred to as "flash." Preferably, the latching tab 50b is disposed below the plane of the peripheral flange to permit the latching tab 50b to be forced into underlying relationship with the peripheral flange by applying a deforming force to the front wall of the frame member in the direction of arrow 62. When "flash" connects the latching tab to the peripheral flange it will be broken by the deforming force. The position of the frame member 26b, with the deforming force applied thereto, is shown in solid lines in FIGS. 7 and 8. While maintaining this deforming force on the frame member 26b the moisture impervious sheet 28b is adhered to the upper surfaces of the container body 12b and frame member 26b in a taut condition to maintain the frame member in its deformed condition shown in solid lines in FIGS. 7 and 8. If desired, a vacuum forming and die-cutting process can be employed to form the container body 12b and peripheral frame member 26b of the packaging system 10b in the manner described earlier in this application.

The methods of forming the packaging system 10b permits formation of the closure lid 24b in a closed position, and also permits the inclusion of an inwardly extending latching tab 50b on the lid for underlying the peripheral flange 23b of the container body 12b to provide an effective seal for the packaging system 10b after the lid has been opened to break the connection between the moisture impervious sheet 28b and the upper surface of the container body.

In a preferred embodiment of this invention, as is shown in phantom in FIG. 7, the front end of the peripheral frame member 26b is molded in an outwardly radius configuration to permit said front end to assume a substantially linear configuration after it has been deformed to force the latching tab 50b into underlying relationship with the peripheral flange 23b of the container body 12b.

The packaging system 10b is utilized by lifting upwardly on the front end of the peripheral frame member 26b to manually defeat the connection between the latching tab 50b and the downwardly facing surface of the peripheral flange section 23b. The closure lid 24b is then pivoted about hinge 32b to peel the moisture impervious sheet 28b off of the upper surface 18b of the container body 12 when the sheet is adhered to said upper surface. The integral hinge 32b formed by the web connecting the container body 12b and the peripheral frame member 26b retains the closure lid 24b on the container body when the lid is in its opened position. After the desired number of premoistened wipes 21 have been removed from the interior compartment, the packaging system is reclosed by pressing down on the front wall of the peripheral frame member until the latching tab 50b snaps into underlying relationship with the peripheral flange section 23b of the container body 12b.

The peripheral frame members and container bodies of the packaging systems of this invention may be made from suitable plastic materials which are well known to those skilled in the molding art. For example, suitable materials include polypropylene, polyethylene, and in some cases polystyrene. When the hinge is provided intermediate front and rear ends of the peripheral frame member it may be suitable to form the peripheral frame member from a material, such as polystyrene, which may fracture at the hinge line when the lid is initially opened. In such a case the flexible sheet forming the top of the lid will provide the necessary hinge action, and also retain the fractured sections of the frame member together. However, when a more reliable or durable hinge is required, polyethylene or polypropylene preferably is employed to form the hinge section.

The flexible moisture impervious sheet employed as the top wall of the closure lids in all of the embodiments of this invention may be comprised of any suitable moisture-impervious material such as waxed paper, plastic film, foil, or laminated combinations thereof. The moisture impervious sheet is adhered to the frame member and the upper surface of the container body by any suitable means, such as heat sealing, adhesive, etc. Although the preferred embodiments of the packaging systems of this invention have been shown in substantially rectangular form, packaging systems in accordance with this invention may be formed in various other shapes and configurations.

What is claimed is:

1. A method of forming a packaging system with a closure lid in a closed position on a container body, said method comprising the steps of:
   A. integrally molding of container body having an interior compartment for retaining articles therein, a peripheral frame member circumscribing an access opening into the compartment to provide side walls of the closure lid and a flexible web connecting the container body and peripheral frame member to form a hinged connection between the container body and frame member; and
   B. adhering a flexible, moisture impervious sheet to the frame member to form a top wall of the closure lid.

2. The method according to claim 1, including the step of adhering the moisture impervious sheet to the container body to provide a moisture impervious seal over the access opening into the interior compartment.

3. A method of forming a packaging system with a closure lid in a closed position on a container body, said method comprising the steps of
   A. molding a container body having a bottom wall and peripheral walls extending upwardly from the bottom wall, said peripheral walls terminating in an outwardly extending flange disposed about the periphery of an access opening into an interior compartment of the container body;
   B. cutting the flange intermediate end margins thereof to form a peripheral frame member circumscribing the access opening of the container body to provide side walls of the closure lid:
      leaving a section of the flange uncut to provide a hinge joining the frame member to the container body; and
   C. adhering a flexible, moisture impervious sheet to the frame member to form a top wall of the closure lid.

4. The method according to claim 3, including the step of adhering the moisture impervious sheet to the container body to provide a moisture impervious seal over the access opening into the interior compartment.

5. A method of forming a moisture impervious packaging system with a closure lid in a closed position, said packaging system including a container body having a bottom wall and peripheral walls extending upwardly therefrom and terminating in an upper surface defining an access opening into an interior compartment of said body, said interior compartment being adapted to receive contents therein, a closure lid having a peripheral frame member and a flexible moisture impervious sheet, and a flexible web connecting a rear peripheral wall of the container body with a rear end of the peripheral frame member to provide a hinged connection between the frame member and container body, said peripheral frame member including a peripheral upper surface defining an open area which is greater than the area of the access opening into the interior compartment of said body, said method including the steps of:
   simultaneously molding the container body, flexible web and peripheral frame member with said frame member circumscribing the container body in the position it assumes when the lid is in a closed position; and
   adhering the flexible, moisture impervious sheet to the frame member to form a top wall of the closure lid and to the upper surface of the container body to provide a moisture impervious seal over the access opening into the interior compartment of said container body.

6. A method of forming a moisture impervious packaging system with a closure lid in a closed position, said packaging system including a container body having a bottom wall and peripheral walls extending upwardly therefrom and terminating in an upper surface defining an access opening into an interior compartment of said body, said interior compartment being adapted to receive contents therein, a closure lid having a peripheral frame member and a flexible moisture impervious sheet, and a flexible web connecting a rear peripheral wall of the container body with a rear end of the peripheral frame member to provide a hinged connection between the frame member and the container body, said peripheral frame member including a peripheral upper surface defining an open area which is greater than the area of the access opening into the interior compartment, said method comprising the steps of:

a. simultaneously molding the container body, flexible web and peripheral frame member with said frame member circumscribing the container body in the position it assumes when the lid is in a closed position;

b. forming a latching tab extending inwardly from a front end of the peripheral frame member, said latching tab terminating outwardly of a peripheral flange section of a front peripheral wall of said container body;

c. depressing the front end of the frame member inwardly to position the latching tab into underlying relationship with the peripheral flange section on the front peripheral wall of the container body; and, while maintaining said depressing force, d. adhering the flexible, moisture impervious sheet in a taut condition to the frame member and the upper surface of the container body to maintain the latching tab in underlying relationship with the peripheral flange section on the front peripheral wall of the container body after the depressing force has been removed.

7. The method according to claim 6, including the step of initially forming the peripheral frame member with the latching tab end thereof radiused outwardly of the peripheral flange section of the front peripheral wall of said container body, and applying said depressing force to said radiused end to force it into a substantially linear shape with the latching tab underlying the peripheral flange section of the front peripheral wall of said container body.

* * * * *